(12) United States Patent
Moore et al.

(10) Patent No.: US 7,312,547 B2
(45) Date of Patent: Dec. 25, 2007

(54) ALTERNATOR WITH REPLACEABLE RESISTOR, AND METHOD OF CHANGING THE MAXIMUM OUTPUT CURRENT OF AN ALTERNATOR

(75) Inventors: Daniel L. Moore, Snohomish, WA (US); George W. Panagotacos, Corona, CA (US)

(73) Assignee: Lamar Technologies LLC, Marysville, WA (US)

( * ) Notice: Subject to any disclaimer, the term of this patent is extended or adjusted under 35 U.S.C. 154(b) by 0 days.

(21) Appl. No.: 11/067,041

(22) Filed: Feb. 24, 2005

(65) Prior Publication Data

US 2005/0285472 A1 Dec. 29, 2005

Related U.S. Application Data

(60) Provisional application No. 60/547,485, filed on Feb. 25, 2004.

(51) Int. Cl.
*H02K 5/00* (2006.01)
(52) U.S. Cl. ...................... 310/91; 310/68 R

(58) Field of Classification Search ............ None
See application file for complete search history.

(56) References Cited

U.S. PATENT DOCUMENTS

| | | | | |
|---|---|---|---|---|
| 3,361,081 A * | 1/1968 | Bliss | .................... | 104/289 |
| 3,361,915 A * | 1/1968 | Baker | .................... | 310/68 R |
| 3,378,708 A * | 4/1968 | Baker | .................... | 310/68 R |
| 3,381,210 A * | 4/1968 | Shano et al. | ............... | 322/100 |
| 3,496,394 A * | 2/1970 | Balche et al. | ............ | 310/68 R |
| 3,588,617 A * | 6/1971 | Grozlinger | ................ | 361/813 |
| 5,627,422 A * | 5/1997 | Boggs et al. | ............... | 310/105 |
| 5,705,870 A * | 1/1998 | Thomsen et al. | ........... | 310/91 |

* cited by examiner

*Primary Examiner*—Thanh Lam
(74) *Attorney, Agent, or Firm*—Wells St. John P.S.

(57) ABSTRACT

An alternator comprises a housing including a first portion, and a second portion having a plurality of electrical connectors and having an aperture; a stator supported in the first portion of the housing; a rotor supported for rotation relative to the stator and configured to have a force current applied thereto; and a resistor coupled to the rotor and configured to reduce the current through the rotor, the resistor being removable and replaceable. Other apparatus and methods are provided.

19 Claims, 4 Drawing Sheets

ALTERNATOR WITH REPLACEABLE RESISTOR, AND METHOD OF CHANGING THE MAXIMUM OUTPUT CURRENT OF AN ALTERNATOR

RELATED PATENT DATA

This patent claims priority to U.S. Provisional Patent Application No. 60/547,485, which was filed Feb. 25, 2004.

TECHNICAL FIELD

The present invention relates to alternators.

BACKGROUND OF THE INVENTION

Alternator design is known in the art. It is a fundamental principle of physics that when a magnet rotates in a wire loop, a current is induced. A magnet has a south pole and a north pole. Assume that the north pole is just passing a top part of the wire loop and the south pole is just passing the bottom part of the loop. When the magnet has rotated through 180 degrees, the south pole will be passing the top part of the loop while the north pole will be passing the bottom part of the loop. This causes the direction of induced current to be reversed. In this way, alternating current is induced in each turn of wire in a stator of an alternator.

In an alternator, a rotor is spun inside a stator. The stator includes multiple windings of wire. A single turn would not induce enough voltage nor carry enough current for typical applications of an alternator. Therefore, a practical alternator has a stator with many turns of wire.

The rotor defines an electromagnet that provides a magnetic field that is spun inside the windings of wire to generate current. A relatively small field current used to define the electromagnet is supplied to the rotor by two small brushes that each ride on separate and continuous slip rings. Field current passes through the brushes into the slip rings into the rotor.

There are typically three separate windings of wire in the stator arranged so that the AC (alternating current) that is generated by each winding is slightly out of phase compared to the other windings. This smoothes the electrical output of the alternator.

A rectifier circuit including diodes is used to convert the AC to DC (direct current). The diodes are arranged so that current from each of the three stator wires is only allowed to pass in one direction, and the three outputs are connected together. A voltage regulator is typically provided to the DC output to keep the output voltage relatively steady. The voltage regulator can be a mechanical or solid state device.

For externally regulated alternators, there are typically four connections on the alternator: the output terminal (often labeled BAT), the ground terminal (often labeled GRD) or ground may be "implied" though the metal mountings of the alternator, the field connection (often labeled F), and separate connections to each of the three poles on the stator (R).

Internally regulated models also have four connections, but the voltage regulator is inside the alternator and constructed of solid-state components. For internally regulated alternators, the connections are: an output terminal (typically labeled BAT), a ground terminal (typically labeled GRD) or ground may be "implied" though the metal mountings of the alternator, and two connections typically labeled 1 and 2. One of these connections is a relatively small wire that is connected to a battery and the other is connected to a charge indicator light.

Brushes that ride against the slip rings of the rotor of an alternator are components that are likely the number one failure mode of an alternator since the brushes wear out over time due to friction. Such brushes are conventionally internal, and are housed inside the housing of an alternator. For conventional alternators, in order to changes brushes, the alternator must be removed from service and substantially disassembled. The brush blocks then have to be removed from inside of a rear shell housing component after the rear shell has been removed from the rest of the alternator.

Certain alternators are known in the art that have removable, externally accessible, brush blocks. However, in these designs, the brushes extend out past the end of the main housing. In these designs, the rear bearings of the alternator are axially inside of the slip rings and the brushes.

Certification of components for aircraft use is a lengthy process. Components used in alternators for aircraft have subtle differences when compared with alternators used in automobiles in view of the different environments in which they are used and more serious consequences of failures in aircraft environments. For example, different brush materials are used for alternators used in aircraft than the material used in automotive alternators.

An aircraft alternator designed to deliver a certain level of amperage cannot simply be used on an airplane designed for a lower amperage alternator. For example, an 80 Amp alternator cannot be used on a 40 Amp airplane even though a regulator will regulate the current down to 40 Amps. The problem is that aircraft wiring is typically geared around the maximum rating of the alternator.

For example, forty years ago, when some of these planes were built, 40 Amp alternators were the biggest alternators available. Therefore, the gauge of the wiring going from the alternator was geared around that rating. If higher amperage current, such as 80 Amps, was passed through, the wiring could burn up. Provided that the regulator is working correctly, this would not happen. However, regulators sometimes fail and fields sometimes short. Safety standards for aircraft dictate that an aircraft alternator cannot be capable of putting out more than the designated current. This means that different alternator designs are used in different aircraft, causing manufacturers to manufacture multiple different types of alternators and causing vendors and repair facilities to stock multiple different types of alternators.

SUMMARY OF THE INVENTION

Embodiments of the invention provide an alternator with a removable brush block. Other embodiments provide an alternator with a replaceable resistor in series with the field.

One aspect of the invention provides a method of changing the maximum current output of an alternator, in view of aircraft safety standards requiring that alternators for aircraft not be able to put out more than a predetermined amperage, notwithstanding the ability to regulate current with a regulator outside of the alternator. Other methods and apparatus are also provided.

BRIEF DESCRIPTION OF THE DRAWINGS

Preferred embodiments of the invention are described below with reference to the following accompanying drawings.

DETAILED DESCRIPTION OF THE
PREFERRED EMBODIMENTS

This disclosure of the invention is submitted in furtherance of the constitutional purposes of the U.S. Patent Laws "to promote the progress of science and useful arts" (Article 1, Section 8).

As mentioned above, brushes that ride against the slip rings of the rotor are perhaps the number one failure mode in alternators. They wear out. Therefore, besides making them as strong and as long lasting as possible, they are made to be easily interchanged.

With standard alternators, and with all or substantially all aviation alternators, in order to change out brushes, substantially the whole alternator has to be disassembled to replace the brushes.

Figure 1:
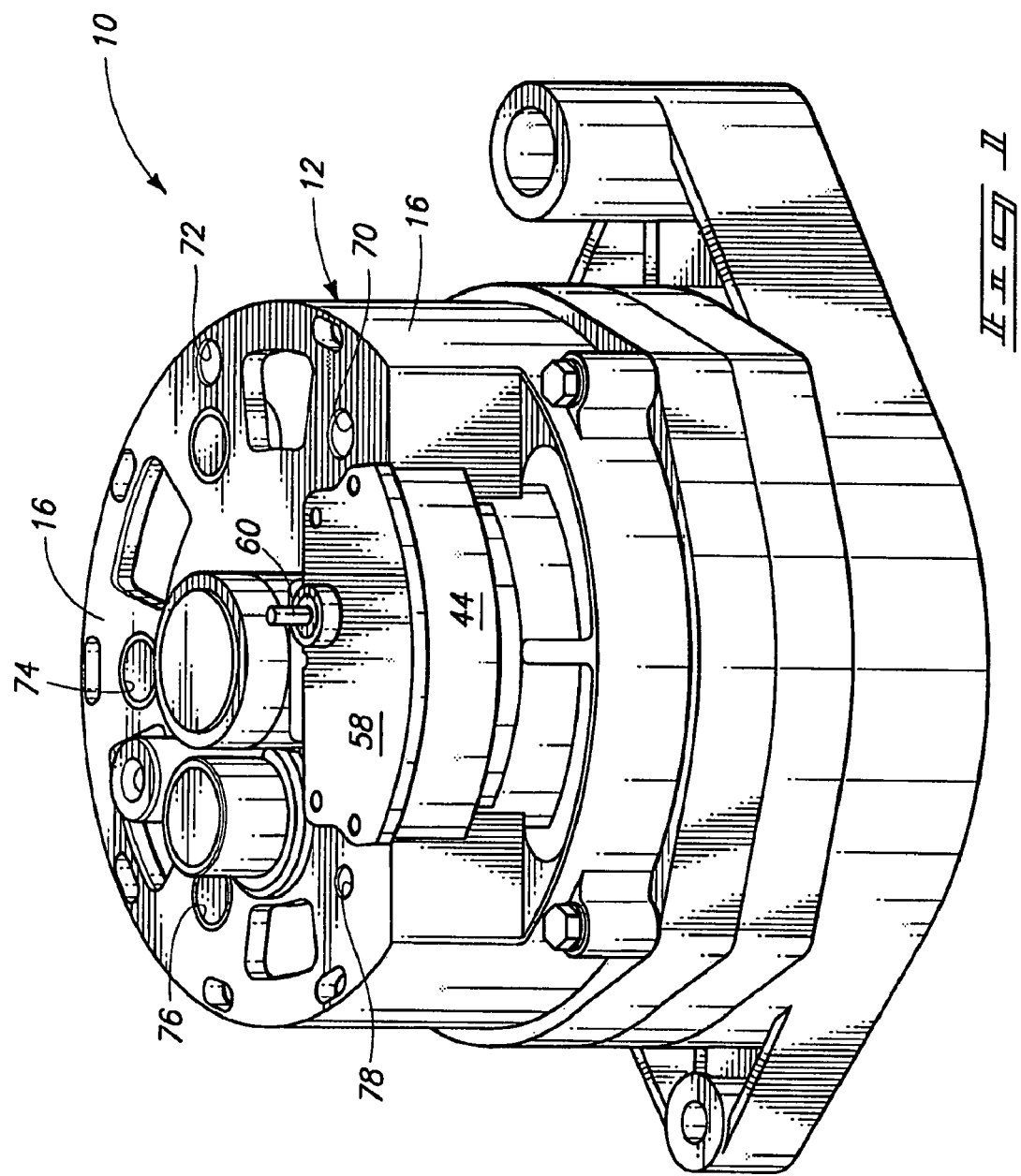
FIG. 1 is a perspective view of an alternator in accordance with various embodiments of the invention.
Figure 2:
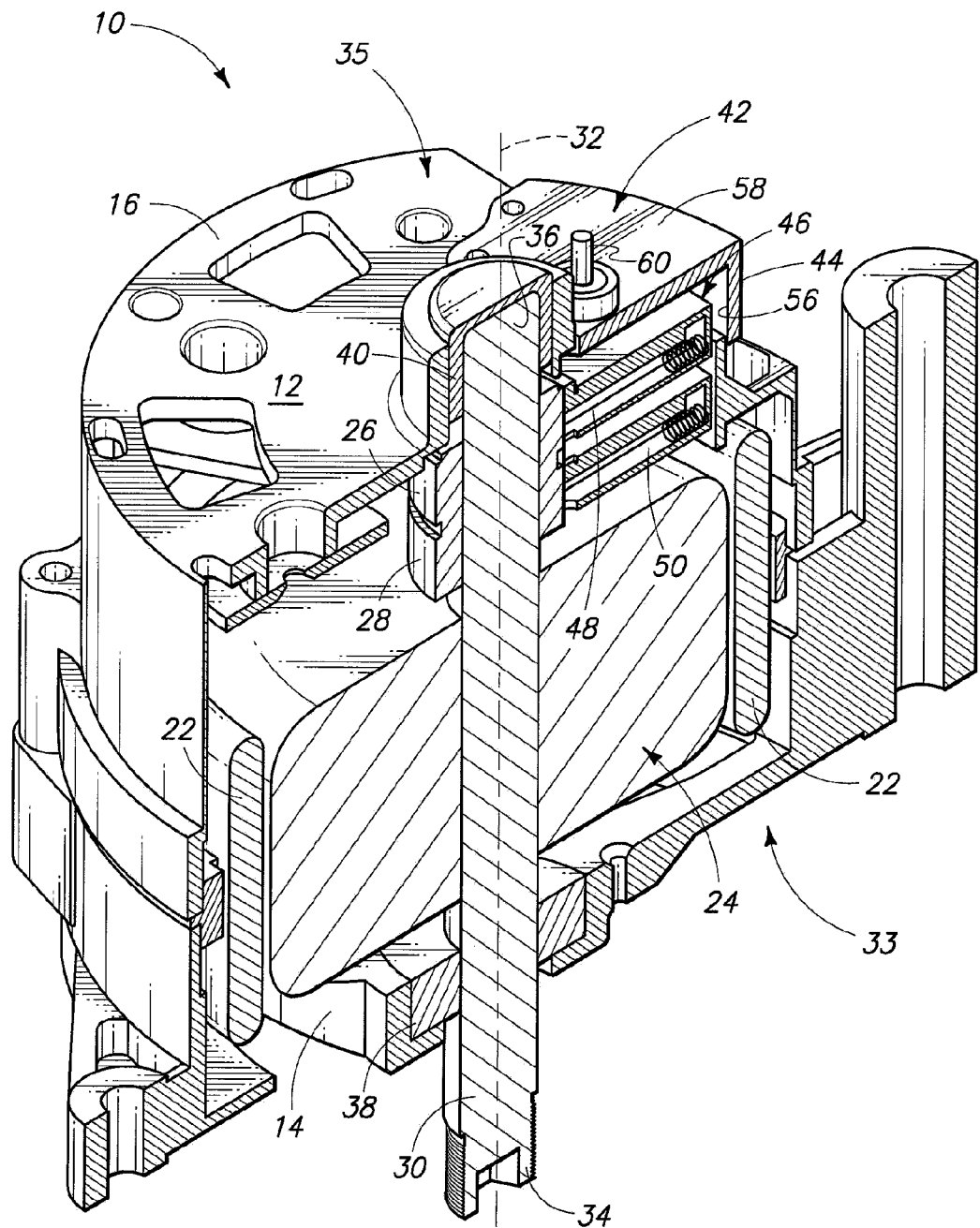
FIG. 2 is a cut away perspective view of the alternator of FIG. 1.

FIG. 1 shows an alternator 10 embodying various aspects of the invention. In the embodiment of FIG. 1, the alternator 10 is an aircraft alternator. The alternator 10 includes a housing 12. In the illustrated embodiment, the housing 12 includes a front case portion 14 (FIG. 2), and a rear case portion 16 having a plurality of electrical connectors 60, 70, 72, 74, 76, and 78 for inputs and outputs. Connector 60 is a field input. Connector 70 is a power output. Alternator 10 has a mounting end 33 and a free end 35 (see FIG. 2). The housing further includes an aperture or material removed portion 20 (FIG. 3).

The alternator 10 includes a stator 22 (FIG. 2) supported in the housing 12. More particularly, in the illustrated embodiment, the stator 22 is at least partially supported by the front case portion 14 of the housing and the rear case portion 16 can be removed from the front case portion 14 without removing the stator 22. The alternator 10 further includes a rotor 24 (FIG. 2), including slip rings 26 and 28, and including a rotor shaft 30 configured to rotate about an axis 32. The shaft has opposite ends 34 and 36.

The alternator 10 further includes front and rear bearings 38 and 40 respectively supporting the ends 34 and 36 of the rotor shaft 30 in the housing 12 for rotation relative to the stator 22.

Figure 3:
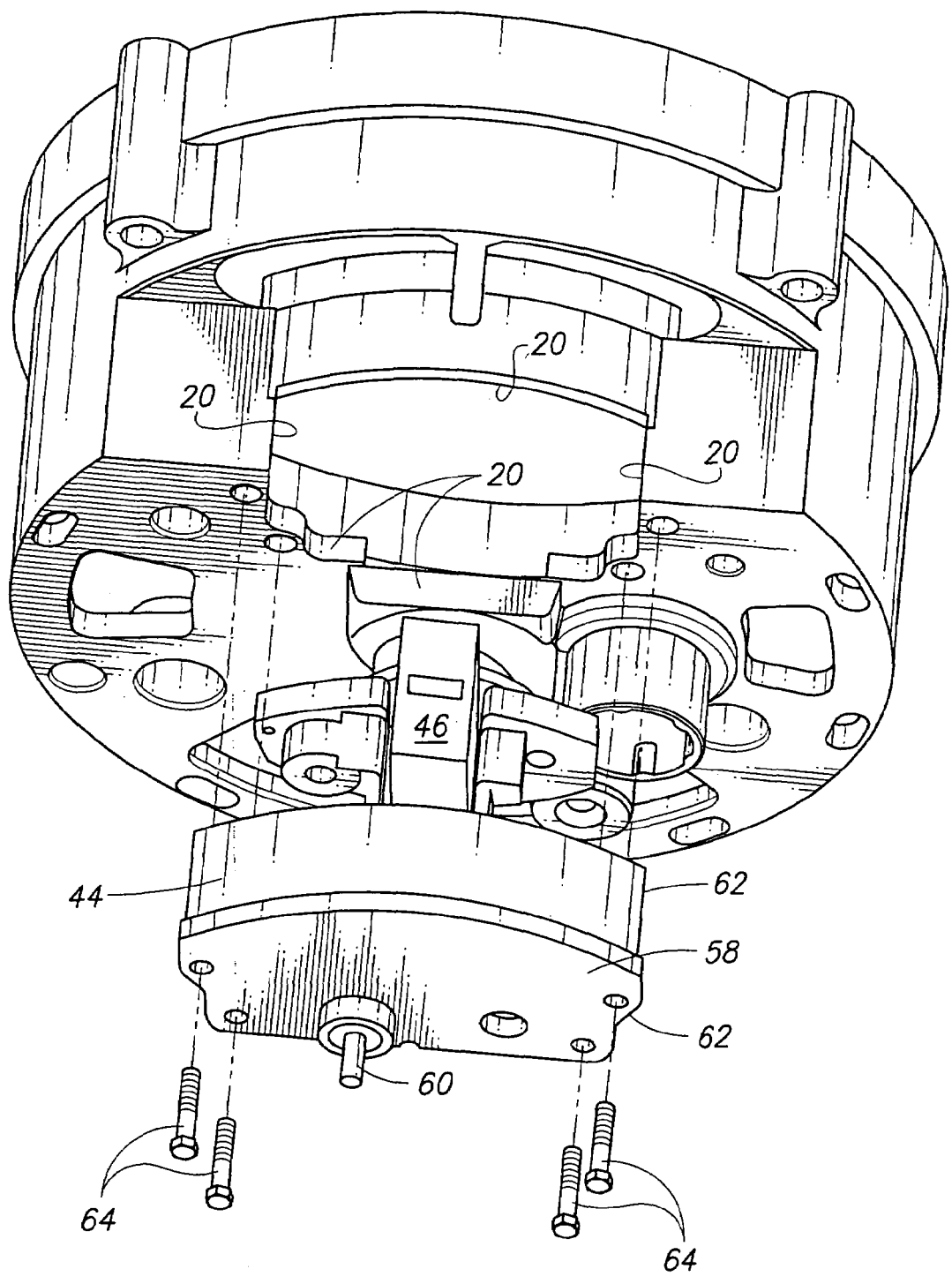
FIG. 3 is an exploded perspective view of a housing portion, brush holder, and holder plate, of the alternator of FIGS. 1 and 2.
Figure 4:
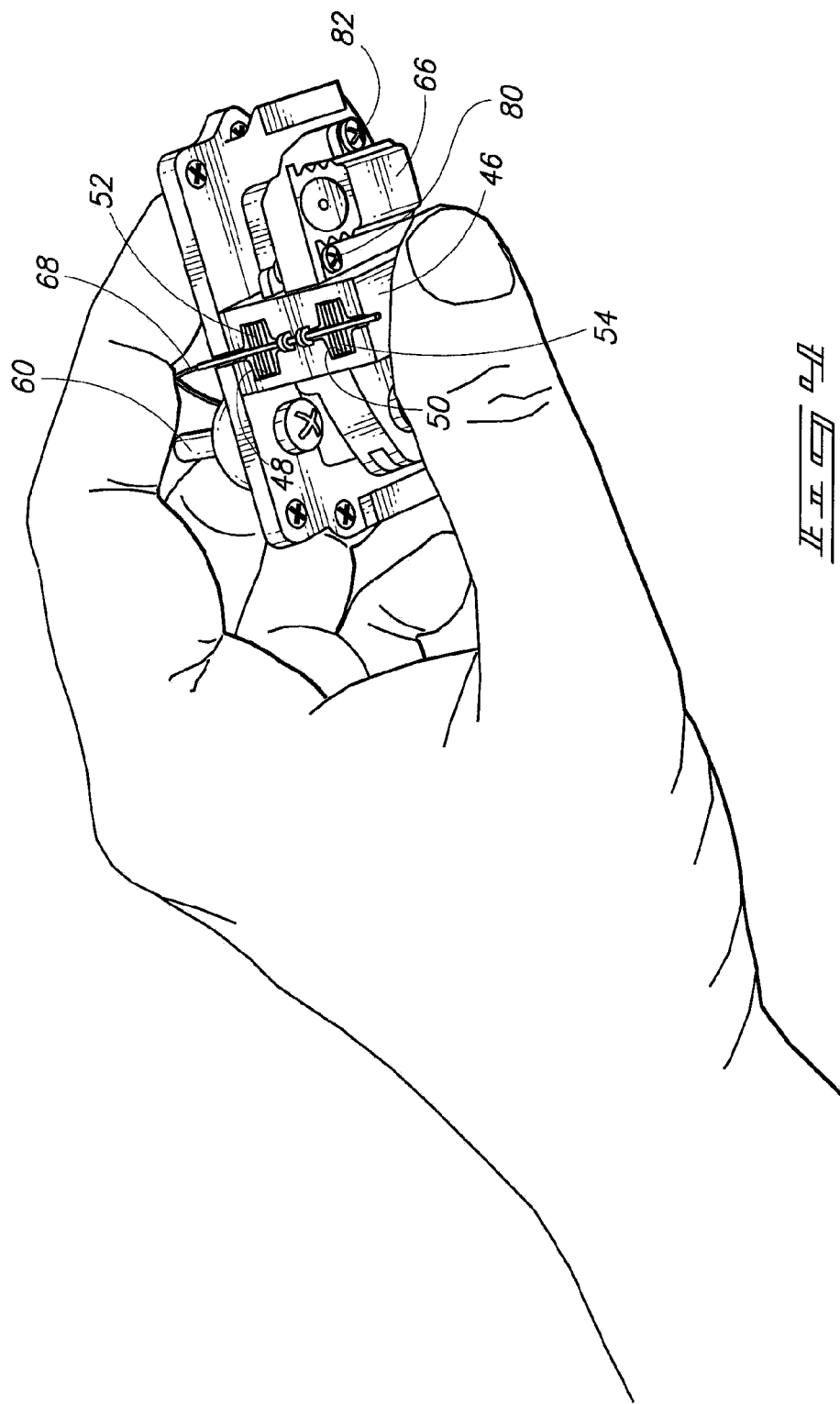
FIG. 4 is a view of the brush holder of FIG. 3, assembled to the holder plate of FIG. 3, and together removed from the alternator of FIG. 1.

The alternator 10 further includes a removable assembly 42 (FIG. 2) including a support member or holder plate 44 and a brush holder 46 (FIG. 3). The brush holder 46 includes brush blocks 48 and 50 (FIG. 2) configured to slidingly support brushes 52 and 54 (FIG. 4). The term brush block, as used herein, refers to any structure configured to support a brush. In the illustrated embodiment, the brush blocks 48 and 50 are each defined by a cartridge or chamber that slidingly receives a brush and a spring. More particularly, in the illustrated embodiment, the brushes 52 and 54 are biased by springs in the cartridges 48 and 50 into engagement with the slip rings 26 and 28. The brushes 52 and 54 are electrically configured to pass a force current through the rotor 24 via the slip rings 26 and 28. In the illustrated embodiment, the brushes 52 and 54 are each made of a special carbon used for aircraft applications. For example, for aircraft applications, aircraft grade brush material is used for high altitude applications.

The brush holder 46 (FIGS. 3 and 4) is removably supported by the support member 44. The removable assembly 42 is selectively fixed relative to the rear case portion 16 of the housing against movement relative to the front case portion 14 of the housing when in a "in use" position. When in the "in use" position, the brushes 52 and 54 engage the slip rings 26 and 28 and the support member 44 at least partially closes the aperture or material removed portion 20 (FIG. 3).

The support member 44 has an inside surface 56 (FIG. 2) configured to face inside the housing 12, when the removable assembly 42 is in the "in use" position, and an outside surface 58 configured to face away from the alternator 10, when the removable assembly 42 is in the "in use" position. The brush blocks 48 and 50 are mounted to, covered by or positioned by the inside surface 56. In the illustrated embodiment, the brush holder 46 is mounted to and movable with the support member 44. The outside surface 58 supports a force terminal 60 which is electrically coupled to one of the brushes 52, 54. In the illustrated embodiment, the force terminal 60 is defined by an electrically conductive post extending away from the support member 44.

In some embodiments, the support member 44 has a surface 62 configured to mate with the material removed portion or aperture 20 to close the aperture 20 when the removable assembly 42 is in the use position. Alternatively, the support member 44 overlaps or covers the aperture 20 either completely or partially.

The slip rings 26 and 28 are located (FIG. 2) between the bearings 38 and 40 with respect to the axis 32 defined by the rotor shaft 30. More particularly, in the illustrated embodiment, the brushes 52 and 54 (FIG. 4) are internal of the housing 12 and the slip rings 26 and 28 are internal of the housing 12. Still more particularly, in the illustrated embodiment, the rear bearings 40 are axially outside of the slip rings 26 and 28, and the slip rings 26 and 28 are on the inside of the housing 12, yet removable brush blocks 48 and 50 are provided. There are advantages to this design. The farther apart the front bearings 38 are located from the rear bearings 40, the more stable the rotation will be. Also, this design gives better protection to the slip rings 26 and 28.

The removable assembly 42 is removable from the rear case portion 16 of the housing 12 from outside the housing 12 (e.g., with a hand tool such as a screwdriver), without the need to remove the rear case portion 16 of the housing 12 from the front case portion of the housing 14.

In the embodiment of FIG. 1, to remove the removable assembly 42 and the brush blocks 48 and 50, a user removes fasteners 64 (FIG. 3) that hold the removable assembly 42 in the housing 12, from outside the housing 12, removes the removable assembly 42, replaces the assembly 42 with a new assembly 42 (or replaces the brushes 52 and 54 within the assembly), and refastens the new or upgraded assembly to the housing 12. A removable pin 68 (FIG. 4) holds the brushes 52 and 54 in the brush blocks 48, against the bias of springs in the brush blocks 48 and 50, until the removable assembly 42 is replaced. After the removable assembly 42 is replaced, the pin 68 is removed from the removable assembly 42, allowing the brushes 52 and 54 to extend from the brush blocks 48, 50 into engagement with the respective slip rings 26, 28. In the illustrated embodiment, the fasteners 64 are screws; however, other appropriate fasteners could be used.

The field current passes through the brush 52 or 54 into the slip ring 26 or 28, and into the rotor 24. That applies power to the rotor 24, creating the magnetic field of the rotor 24 that causes the generation of energy in the stator 22.

Typically, alternators are designed such that field current is transmitted generally directly to the rotor. In the illustrated embodiment, the alternator 10 is capable of a predetermined current output. For example, in the illustrated embodiment, the alternator 10 is an aircraft alternator capable of outputting up to about 80 Amps. However, there are aircraft that have different maximum current ratings. For example, some aircraft need 40 Amp alternators, some need 60 Amp alternators, and some need 70 Amp alternators.

Therefore, in some but not all embodiments, the removable assembly 42 further supports a resistor 66 (FIG. 4) configured to reduce current provided to the rotor 24. More particularly, in the illustrated embodiment, the resistor 66 is easily removable and replaceable. Still more particularly, in the illustrated embodiment, the resistor 66 is removable from the housing 12 with the brush blocks 48 and 50.

The resistor 66 is placed in-line with the field current. For example, in some embodiments, the resistor 66 is electrically coupled between the force terminal 60 and one of the brushes 52 and 54. More particularly, the resistor 66 is removably attached to the inside surface 56 of the support member 44 using a pair of screws 80 and 82. Field current travels from externally of the alternator 10 through the post or terminal 60, through this resistor 66, and then to a brush 52 or 54.

Depending upon the resistance value of the resistor 66 that is used, a different model alternator 10 is created for use on an aircraft that uses a certain ampere alternator. In the illustrated embodiment, the brush blocks 48, 50 are replaceable with brush blocks supporting resistors 66 that are appropriate to define a 40, 60, or 70 Amp alternator. Alternatively, the resistor 66 could be removed and replaced with a conductor or bypassed with a jumper to define an 80 Amp alternator. In fact, the same alternator 10 could be adapted to any ampere rating (lower than its maximum output) by replacing the resistor 66. The resistor 66 is on the input or field end of the circuit. By reducing the amount of current going into the alternator 10, the amount of magnetism produced is reduced by the resistor 66.

This design saves expense in manufacturing and in stocking of alternators.

In some embodiments, the alternator case or housing used is a Delco™ 10DN case. Alternative housing styles could also be employed.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An alternator comprising:
   a housing including a first portion, and a second portion having a plurality of electrical connectors and having an aperture;
   a stator supported in the first portion of the housing;
   a rotor supported for rotation relative to the stator and configured to have a force current applied thereto;
   a support member removably mounted to the housing; and
   a resistor removably mounted to the support member by a releasable fastener, electrically coupled to the rotor, and configured to reduce the current through the rotor, the resistor being removable and replaceable.

2. An alternator in accordance with claim 1 wherein the resistor is removable or replaceable with other resistors such that the alternator selectively defines an alternator having a maximum output of one of 40, 60, and 70 Amps, regardless of whether a regulator is used.

3. An alternator in accordance with claim 1 wherein the alternator has a force terminal, supported by the housing, and wherein the resistor is electrically coupled between the force terminal and the rotor.

4. An alternator in accordance with claim 1 and further including a removable assembly removably supported by the second portion of the housing and including the support member, the support member having an inside surface and an outside surface, wherein the inside surface supports the resistor.

5. An alternator in accordance with claim 1 and further including a removable assembly removably supported by the second portion of the housing and including the support member, the support member having an inside surface configured to face inside the housing, and an outside surface configured to face away from the alternator, wherein the inside surface supports the resistor, and wherein the outside surface supports a force terminal which is electrically coupled to the resistor.

6. An alternator in accordance with claim 5 wherein the housing has an aperture and wherein the support member has a surface configured to selectively mate with the aperture to close the aperture.

7. An alternator in accordance with claim 5 wherein the resistor is removably mounted to the support member.

8. An alternator in accordance with claim 5 wherein the resistor is removably mounted to the support member by screws.

9. An alternator in accordance with claim 5 wherein the removable assembly further supports a brush block.

10. An alternator comprising:
    a housing including a first portion, and a second portion having a plurality of electrical connectors and having an aperture;
    a stator supported in the first portion of the housing;
    a rotor supported for rotation relative to the stator and configured to have a force current applied thereto; and
    a resistor mounted to the housing, electrically coupled to the rotors and configured to reduce the current through the rotor, the resistor being removable and replaceable; and
    a removable assembly removably supported by the second portion of the housing with a reusable fastener and including a support member, the support member having an inside surface and an outside surface, the inside surface configured to support and releasably retain the resistor with a fastener, wherein the resistor can be removed and replaced without removing the second portion of the housing from the first portion of the housing.

11. An alternator in accordance with claim 10 wherein the removable assembly is replaceable with assemblies having different valued resistors such that the alternator selectively defines an alternator having a maximum output of one of 40, 60, and 70 Amps, regardless of whether a regulator is used.

12. An alternator in accordance with claim 10 wherein the alternator has a force terminal, supported by the housing, and wherein the resistor is electrically coupled between the force terminal and the rotor.

13. An alternator in accordance with claim 10 wherein the inside surface supports the resistor, and wherein the outside surface supports a force terminal which is electrically coupled to the resistor.

14. An alternator in accordance with claim 10 wherein the housing has an aperture and wherein the support member has a surface configured to selectively mate with the aperture to close the aperture.

15. An alternator in accordance with claim 10 wherein the resistor is removably mounted to the support member with the fastener.

16. An alternator in accordance with claim 10 wherein the resistor is removably mounted to the support member by screws.

17. An alternator in accordance with claim 10 wherein the removable assembly further supports a brush block.

18. A method of changing the maximum output current of an alternator for use in an aircraft, inside the alternator, the method comprising:

provided an alternator having a stator, a rotor supported for rotation relative to the stator, and a field terminal electrically coupled to the rotor for provision of current to the rotor;

providing a removable resistor in series with the field terminal and a fastener for releasably retaining the resistor; and selectively removing and replacing the removable resistor with a resistance of a different value and of at least zero ohms by demating and mating the fastener to remove a first resistor and subsequently retain a second resistor.

19. A method in accordance with claim 18 wherein the alternator has a housing including a first portion supporting the stator and a second portion removable from the first portion, and wherein providing a removable resistor comprises providing a removable assembly removably supported by the second portion of the housing and including a support member, the support member having an inside surface and an outside surface, the inside surface supporting the resistor, wherein the resistor can be removed and replaced without removing the second portion of the housing from the first portion of the housing.

* * * * *